United States Patent [19]

Allen

[11] Patent Number: 5,165,644
[45] Date of Patent: Nov. 24, 1992

[54] MOUNTING APPARATUS FOR A VIDEO DISPLAY

[76] Inventor: Thomas Allen, 7500 Telephone Rd., Newburgh, Ind. 47630

[21] Appl. No.: 735,910

[22] Filed: Jul. 25, 1991

[51] Int. Cl.⁵ .............................................. E04G 3/00
[52] U.S. Cl. .................... 248/285; 248/919; 248/924
[58] Field of Search ............... 248/917, 919, 921, 922, 248/923, 924, 289.1, 282, 274, 447.1, 458, 670, 664, 674, 676, 131, 145.3, 415

[56] References Cited

U.S. PATENT DOCUMENTS

| | | |
|---|---|---|
| 1,228,583 | 6/1917 | Mueller . |
| 1,396,548 | 11/1921 | Bartlett ............................. 248/282 |
| 1,870,109 | 8/1932 | Goforth . |
| 2,867,401 | 1/1959 | Sheahan . |
| 2,895,702 | 7/1959 | Pierce . |
| 3,096,062 | 7/1963 | Bosshart . |
| 3,889,910 | 6/1975 | Walters ........................... 248/921 X |
| 3,896,576 | 7/1975 | Wolf et al. ........................... 248/282 |
| 4,447,031 | 5/1984 | Sounder, Jr. et al. ........... 248/921 X |
| 4,487,389 | 12/1984 | Ziegler ............................ 248/922 X |
| 4,616,218 | 10/1986 | Bailey et al. . |
| 4,659,047 | 4/1987 | Haller . |
| 4,708,312 | 11/1987 | Rohr ................................. 248/280.1 |

FOREIGN PATENT DOCUMENTS

| | | |
|---|---|---|
| 810502 | 6/1951 | Fed. Rep. of Germany . |
| 680337 | 1/1965 | Italy . |
| 1515056 | 6/1978 | United Kingdom . |
| 2100090 | 12/1982 | United Kingdom . |

*Primary Examiner*—Ramon O. Ramirez
*Attorney, Agent, or Firm*—Wenderoth, Lind & Ponack

[57] ABSTRACT

A mounting apparatus for mounting a video display to a vertical surface has a bracket for connection to the vertical surface. A vertically extending pivot member is mounted to the bracket for pivotable movement about a substantially vertical axis. A support bar is fixed to and extends from the pivot member, and the plurality of support arms extend from the support bar in a direction substantially perpendicular to the support bar. The support arms have a number of separate support members adjustably mounted thereon for supporting separate points on a video display.

16 Claims, 7 Drawing Sheets

MOUNTING APPARATUS FOR A VIDEO DISPLAY

BACKGROUND OF THE INVENTION

1. Field of the Invention

The present invention relates to a mounting apparatus for mounting video displays such as televisions and computer monitors to vertical support surfaces, such as walls.

2. State of the Prior Art

Bosshart U.S. Pat. No. 3,096,062 discloses an adjustable mounting support for a television set and the like which has a wall-mounted bracket mounting a horizontal arm for pivoting movement about a vertical axis. The horizontal arm has two support arms cantilevered thereto for supporting a television set.

Rohr U.S. Pat. No. 4,708,312 discloses an extensible height-adjustable swivel arm for supporting a video display. This device also has a vertical pivot point and a horizontally extending arm. A support is provided at the end of the arm for supporting a video display.

Italian patent publication 680,337 discloses a further television supporting face. This apparatus has a plurality of arms extending from a central point that are adjustable in a horizontal plane, moving support points to different locations for adjustable support of a television set.

SUMMARY OF THE INVENTION

The object of the present invention is to provide a mounting apparatus for mounting a video display such as a television or a computer monitor that can be mounted to a vertical wall and easily and adjustably support a computer monitor or a television set thereon. Moreover, it is an object of the present invention to provide a mounting apparatus for mounting a video display which is adjustable to different sizes of video displays, as well as being adjustable for different positions of the video display on the wall.

The above objects are achieved according to the present invention by the provision of a bracket that can be fastened to a vertical surface. A vertically extending pivot member is mounted to the bracket for pivotable movement about a substantially vertical axis. A support bar is fixed to and extends from the pivot member. A plurality of support arms extend from the support bar in a direction substantially perpendicular to the support bar, the support arms having a plurality of separate support members adjustably mounted on the support arms for supporting separate points on a video display.

Preferably, the bracket is a flat plate which has flanges at opposite vertically spaced ends thereof for mounting the vertically extending pivot member therebetween.

In a further preferred feature, the support bar extends substantially horizontally from the vertically extending pivot member but at a slight downward angle. The slight downward angle is a approximately 6°.

One of the support arms is preferably adjustably mounted on the support bar so as to be movable along the support bar. A sliding bracket adjustably mounts the support onto the support bar, the sliding bracket having a set screw for fixing the support arm on the support bar at different adjusted positions.

Furthermore, the support members are preferably adjustably mounted to the support arms by elongated slots extending in the direction of extent of the support arms. Screws on the support members ride in the elongated slots and are tightened to fix the support members in position. Each of the support members preferably has an upwardly directed recess therein for receiving a supporting boss of the video display.

Furthermore, the other support arm is preferably fixed to the support bar, the adjustable support arm being mounted to the support bar between the fixed support arm and the vertically extending pivot member.

The present invention thus achieves the advantages of mounting a video display such that the video display can be pivoted about a vertical axis so as to be viewable from different positions about a room. Furthermore, the mounting apparatus is adjustable for many different sizes of a video display, and many different arrangements of the supporting bosses on the bottom of the video display. The adjustability of the one support arm allows for different depths of video displays, and the adjustability of the support members allows for different widths of video displays. The slight downward angle to the support bar allows for easier viewing from viewing positions below the level of the video display.

BRIEF DESCRIPTION OF THE DRAWINGS

Further objects, features and advantages of the present invention will be apparent to those of skill in the art from the following detailed description taken in conjunction with the accompanying drawings, in which.

DETAILED DESCRIPTION OF THE PREFERRED EMBODIMENTS

Figure 1:
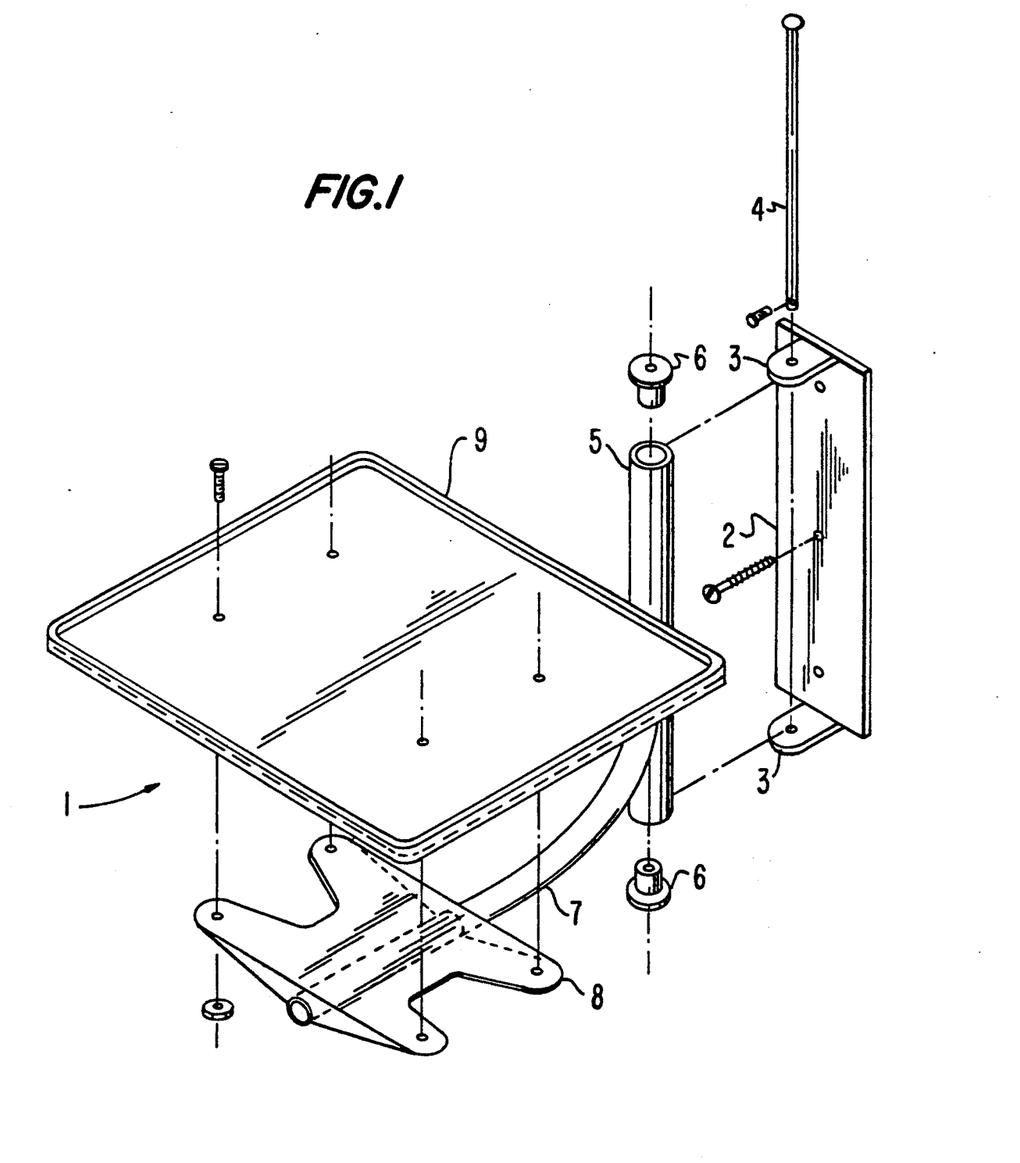
FIG. 1 is an exploded perspective view of a first embodiment according to the present invention.
Figure 2:
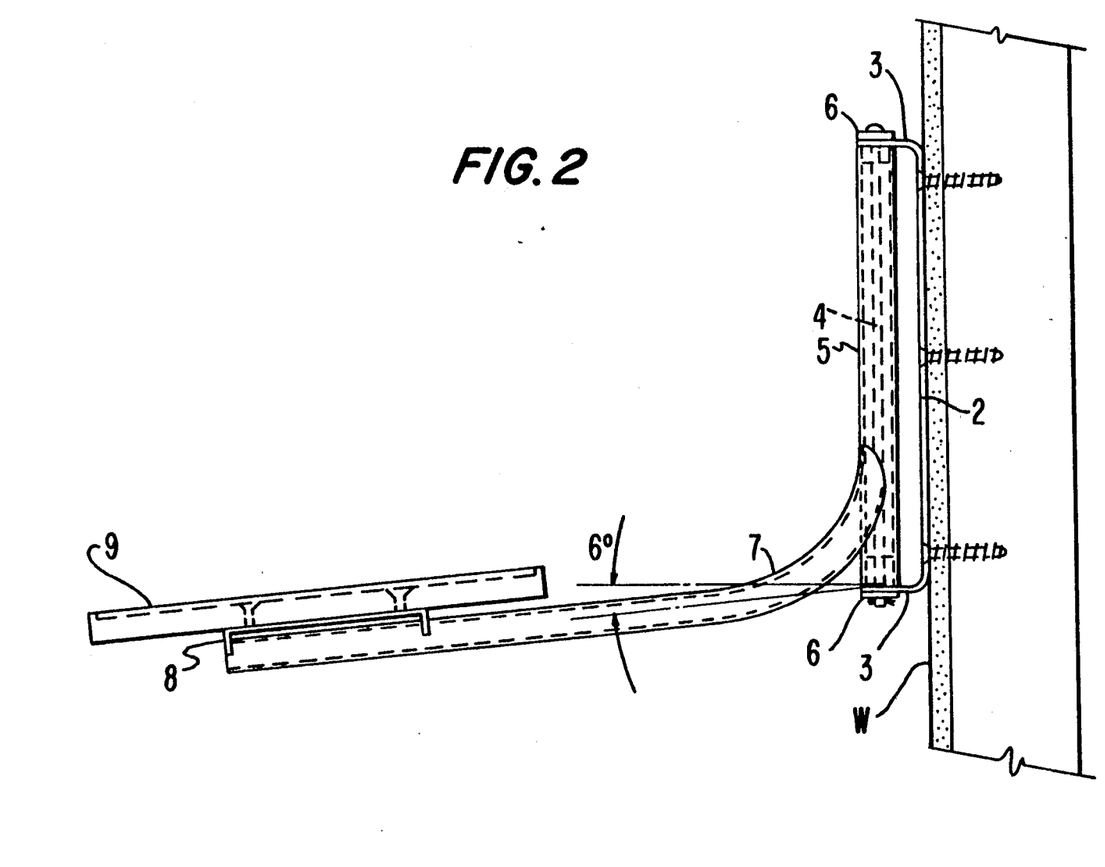
FIG. 2 is a side view of the embodiment of FIG. 1.

A mounting apparatus 1 according to the present invention can initially be seen with reference to FIGS. 1 and 2. A bracket 2 is provided for attachment to a vertical surface such as a wall W. The bracket is preferably a flat support plate, which can be mounted to the wall by any suitable means, such as the illustrated screws. The bracket 2 has two flanges 3 at opposite ends thereof and vertically spaced from each other. Each flange 3 has a hole extending therethrough for a receipt of a pin 4.

Mounted between the flanges 3 and the bracket 2 is a vertically extending pivot member 5. Vertically extending pivot member 5 has two end bushings 6, made for example of a nylon material. As can be seen in FIG. 2, the pin 4 connects the vertically extending pivot member 5 to the flanges 3 of the bracket 2 for pivotable movement thereon about a vertical axis.

Extending substantially horizontally from the pivot member 5 is a support bar 7. The support bar 7 is fixed to the pivot member 5, for example by welding. Incidentally, note that the bracket 2, the vertical pivot member 4, and the support bar 7 are all made of suitable materials such as steel.

The supporting bar 7 has a supporting portion for supporting a video display. In the embodiment according to FIGS. 1 and 2, the supporting portion includes a support tray or plate 9 screwed to an attachment member 8, the attachment member 8 being fixed to the supporting bar 7.

Figure 3:
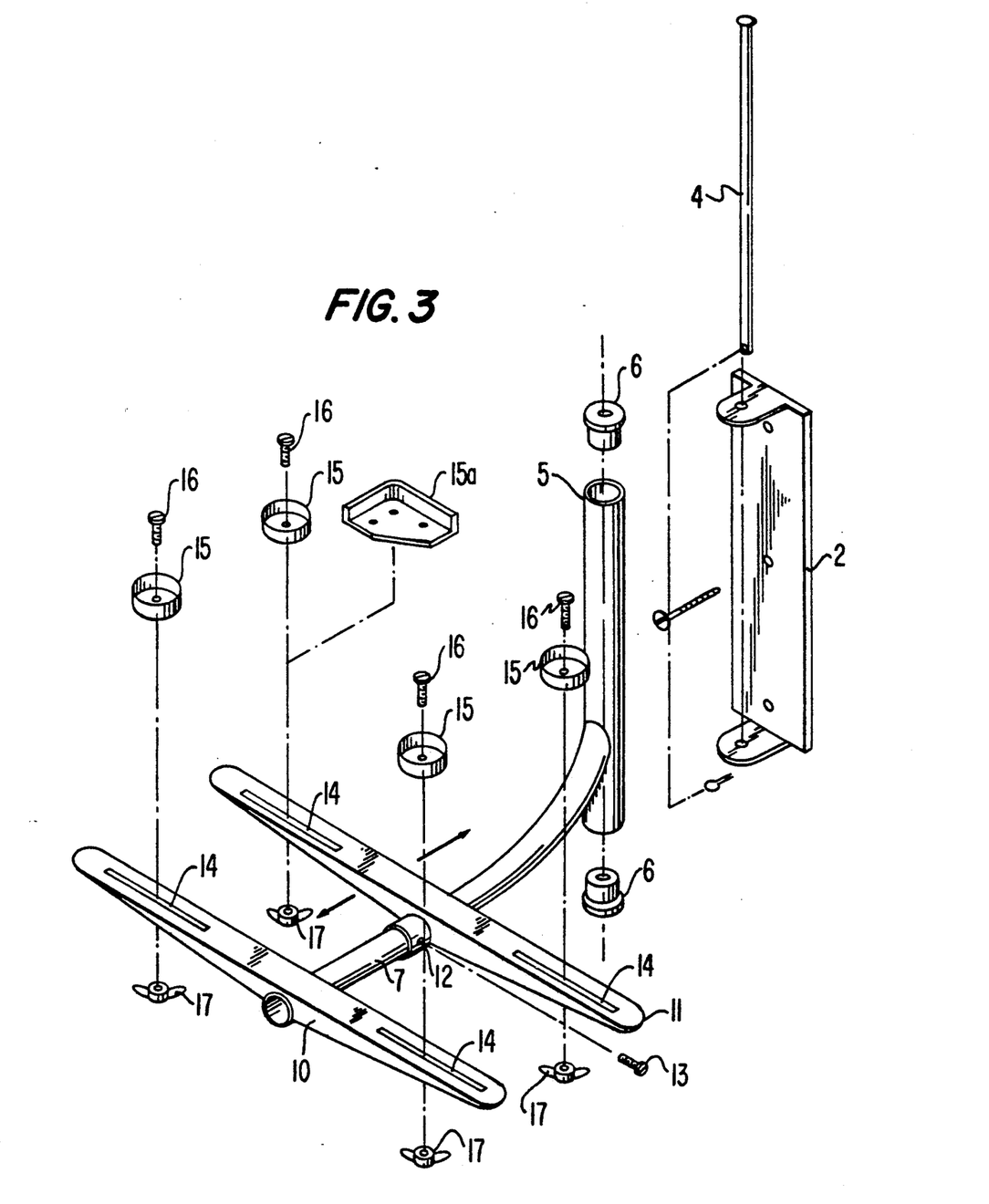
FIG. 3 is an exploded perspective view of a second embodiment according to the present invention.

FIG. 3 illustrates a preferred form of the supporting portion according to a second embodiment of the present invention. In FIG. 3, the supporting bar 7 is made of round steel tubing. A first supporting arm 10 extends perpendicularly from the supporting bar 7 on either side thereof. The supporting arm 10 is welded to the end of the supporting bar 7. A second supporting arm 11 is preferably adjustably mounted on the supporting bar 7. The supporting arm 11 has a central bracket 12 which fits over and slides on the supporting bar 7, allowing the supporting arm 11 to be adjusted along the length of the supporting bar 7. The bracket 12 has an adjustment set screw 13 thereon for fixing the supporting arm 11 in position after the supporting arm 11 has been adjusted to a desired point.

Each end of the respective supporting arms 10 and 11 has a supporting member 15 adjustably provided thereon. The supporting members 15 can thus support four points on a video display. To make the supporting members 15 adjustable, slots 14 are provided in the supporting arms 10 and 11. A screw 16 and nut 17 are provided with each supporting member for fixing the supporting member 15 at a particular point along the horizontal slot 14.

The supporting member 15 may be formed as a supporting cup, having an upwardly facing recess therein for receiving the supporting boss 18 of a video display.

Alternatively, the supporting member may be formed as a corner flange piece 15a, as illustrated in FIG. 3. The corner flange pieces 15a can be used in place of the supporting cups 15 or in conjunction with the supporting cups 15. When used in conjunction with the supporting cups 15, the supporting cups 15 are placed in the corner flange pieces 15a. The supporting bosses of a video display rest in the supporting cups 15, while the corner flanges can support the corners of the video display. In such an arrangement, the corner flange pieces would of course be higher than the supporting cups 15.

Figure 5:
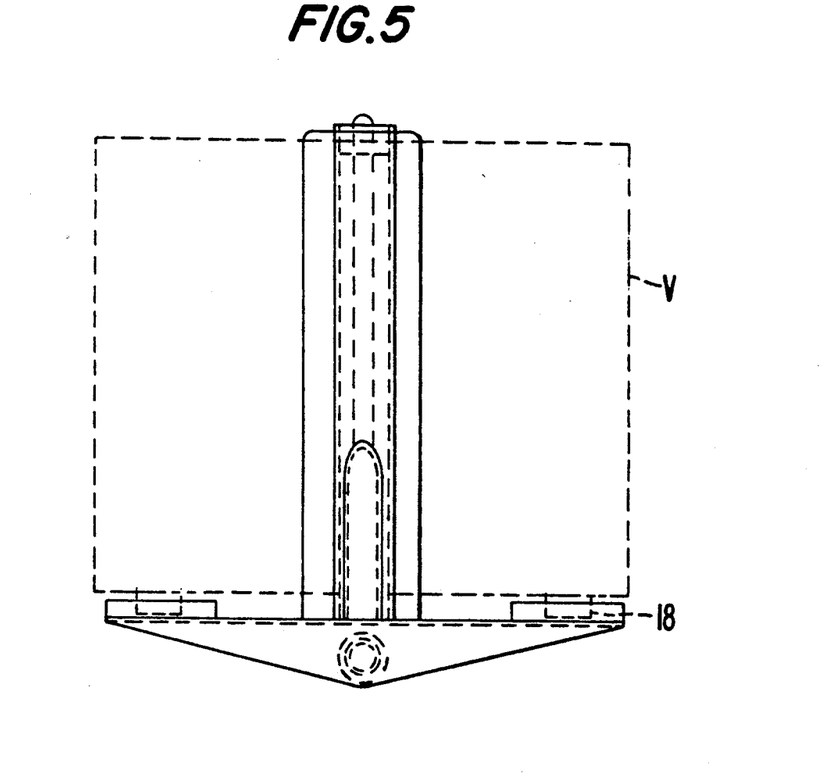
FIG. 5 is a front view of a typical video display used with the second embodiment according to FIG. 4.

Accordingly, a video display can be mounted on the mounting apparatus 1 according to the present invention by adjusting supporting members 15 or 15a on the supporting arm 10 to the width of supporting bosses 18 on the front of the video display (see e.g FIG. 5). The supporting arm 11 is adjusted to the distance between the supporting bosses 18 at the front and rear of the video display, and the supporting members 15 on the supporting arm 11 are adjusted to the width of the rear supporting bosses 18. The video display can then be mounted on the mounting apparatus. Due to the provision of the recesses in the supporting members 15, the supporting bosses 18 of the video display V are securely held, and there is little danger of the video display falling off of the mounting apparatus.

Figure 4:
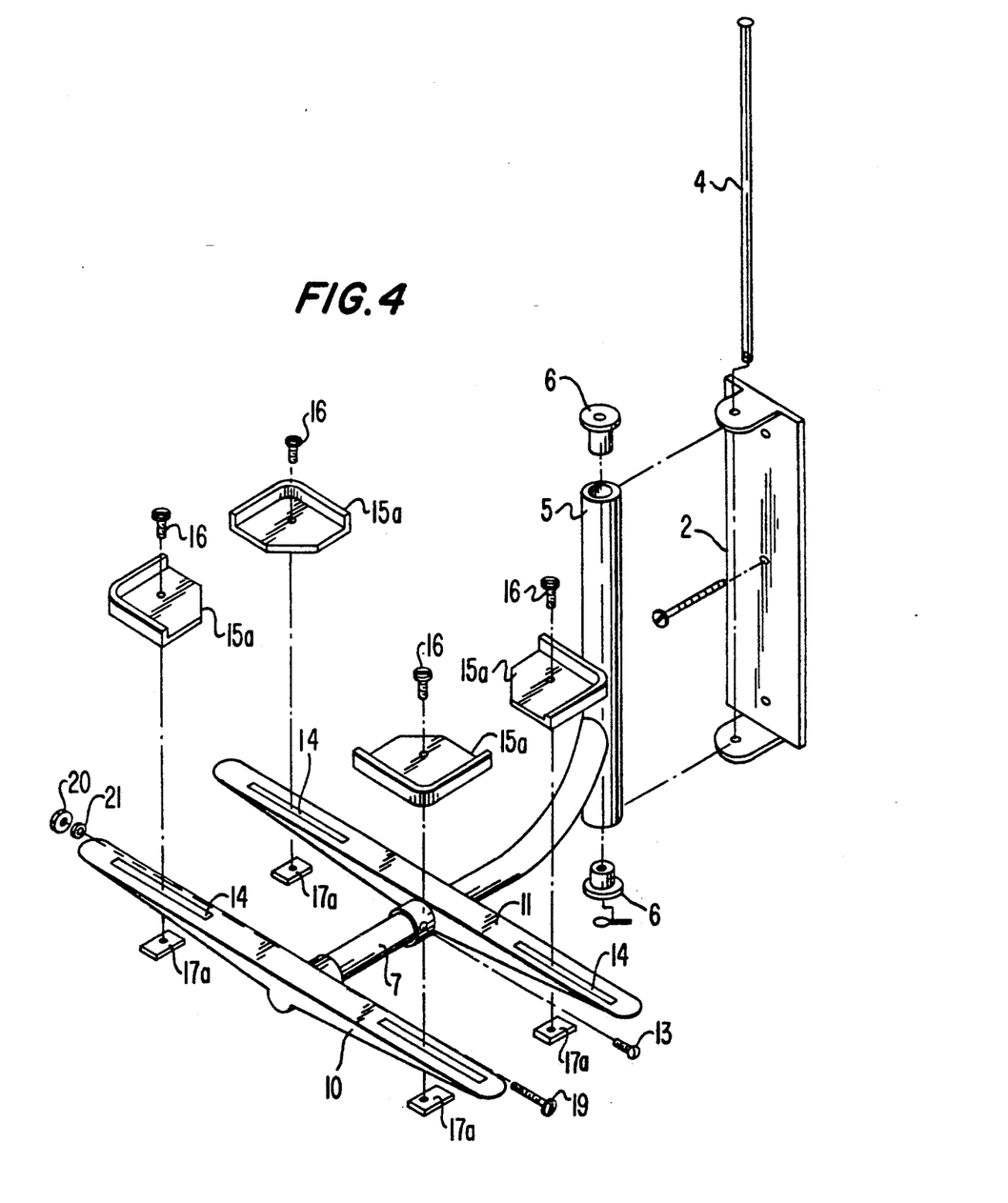
FIG. 4 is an exploded perspective view of a variation on the second embodiment.

FIG. 4 is an exploded view of an arrangement of the second embodiment using only corner flange pieces 15a. Note the use of the rectangular nut 17a in conjunction with screw 16 for mounting the corner flange pieces 15a. A further modification in FIG. 4 relates to the supporting arm 10. In this embodiment, supporting arm 10 has a tubular portion that can mount on to the support bar 7. The support arm 10 is then fixed with a screw 19, nut 20 and washer 21. Also see FIG. 6 for a better view of this feature as assembled.

Figure 6:
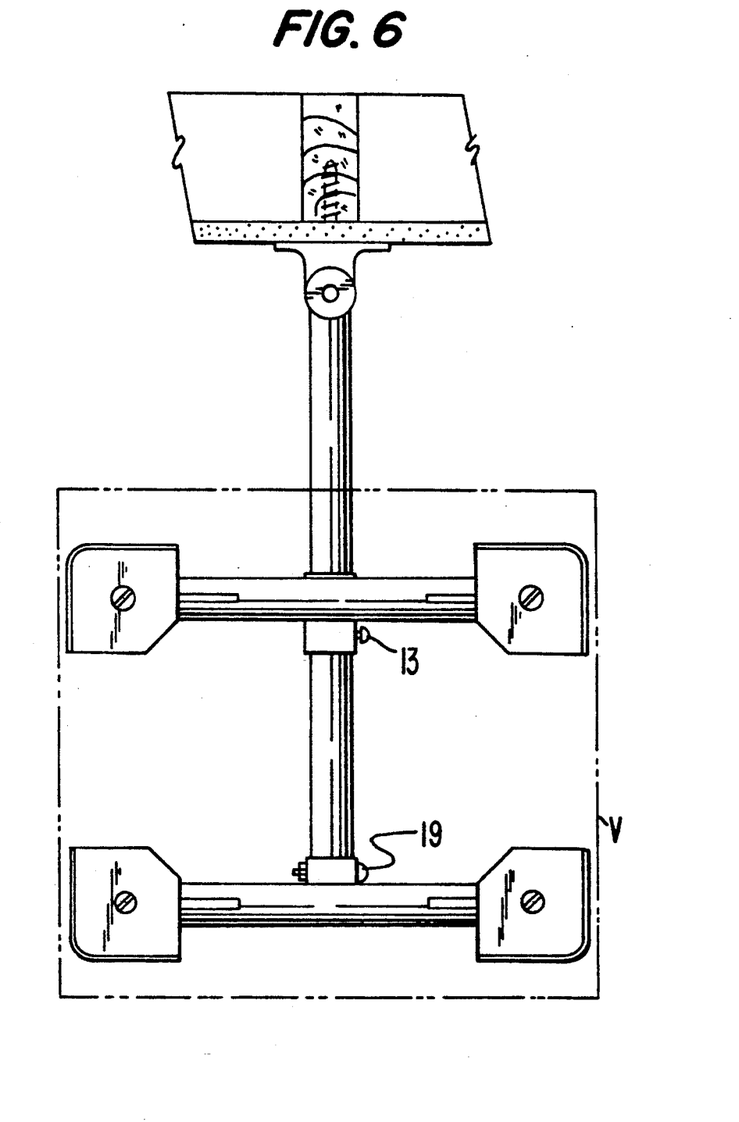
FIG. 6 is a top view of FIG. 5.
Figure 7:
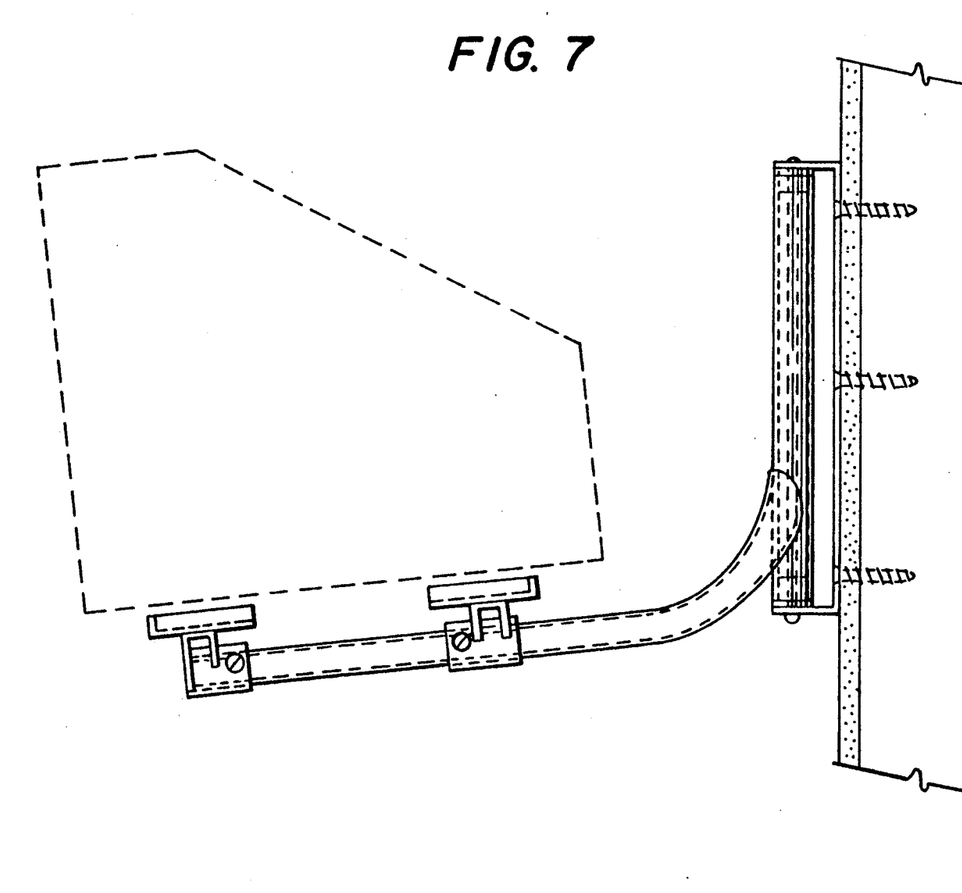
FIG. 7 is a side view of FIG. 5.

FIGS. 5-7 are views of a video display V outlined in position on the mounting apparatus according to the second embodiment of the present invention employing the corner flange pieces 15a.

Note that the vertically extending pivot member 5 allows the video display V to be pivoted for different viewing positions. Furthermore, the downward inclination of the supporting bar 7 allows viewers of the video display V to more easily view the video display from a lower viewing position.

Finally, it should be noted that various other changes and modifications will become apparent to those of ordinary skill in the art reviewing the detailed description above. It is to be understood, therefore, that such changes and modifications may be employed without departing from the spirit of the invention as defined by the scope of the appended claims.

I claim:

1. A mounting apparatus for mounting a video display to a vertical supporting surface, comprising:
    a bracket having means for fastening said bracket to a vertical surface;
    a vertically extending pivot member mounted to said bracket for pivotal movement about a substantially vertical axis;
    a support bar fixed to and extending from said pivot member; and
    a plurality of support arms extending from said support bar in a direction substantially perpendicular to said support bar, said support arms having a plurality of separate support members adjustably mounted thereon for supporting separate points on a video display;
    wherein one of said support arms is adjustably mounted on said support bar so as to be movable along said support bar.

2. The mounting apparatus of claim 1, wherein:
    said bracket comprises a flat plate having flanges at opposite vertically spaced end portions thereof pivotally mounting said vertically extending pivot member therebetween.

3. The mounting apparatus of claim 1, wherein:
    said support bar extends substantially horizontally from said vertically extending pivot member at a slight downward angle.

4. The mounting apparatus of claim 1, wherein:
    said slight downward angle is approximately 6°.

5. The mounting apparatus of claim 1, wherein another of said support arms is fixed to said support bar, said support arm which is adjustably mounted to said support bar being located between said fixed support arm and said vertically extending pivot member.

6. The mounting apparatus of claim 1, wherein:
    said support arm is adjustably mounted to said support bar by a sliding bracket fixed with said support arm slidably mounted on said support bar, said sliding bracket having a set screw for fixing said support arm on said support bar at an adjusted position.

7. The mounting apparatus of claim 6, wherein:
    said support members are adjustably mounted to said support arms by elongated slots extending in the direction of extent of said support arms and screws on said support members riding in said elongated slots.

8. The mounting apparatus of claim 7, wherein:

each said support member has an upwardly-directed recess therein for receiving a supporting boss of a video display.

9. The mounting apparatus of claim 7, wherein:
another of said support arms is fixed to said support bar, said support arm which is adjustably mounted to said support bar being located between said fixed support arm and said vertically extending pivot member.

10. The mounting apparatus of claim 9, wherein each said support member has an upwardly-directed recess therein for receiving a supporting boss of a video display.

11. A mounting apparatus for mounting a video display to a vertical supporting surface, comprising:
a bracket having means for fastening said bracket to a vertical surface;
a vertically extending pivot member mounted to said bracket for pivotal movement about a substantially vertical axis;
a support bar fixed to and extending from said pivot member; and
a plurality of support arms extending from said support bar in a direction substantially perpendicular to said support bar, said support arms having a plurality of separate support members adjustably mounted thereon for supporting separate points on a video display;
wherein said support members are adjustably mounted to said support arms by elongated slots extending in the direction of extent of said support arms and screws on said support members riding in said elongated slots.

12. The mounting apparatus of claim 11, wherein each said support member has an upwardly-directed recess therein for receiving a supporting boss of a video display.

13. A mounting apparatus for mounting a video display to a vertical surface, comprising:
a vertically extending pivot member;
a bracket means for vertically pivotably mounting said pivot member to a vertical surface;
a support bar fixed to and extending from said pivot member; and
a first support arm fixed to and extending substantially perpendicularly from said support bar;
a second support arm having means for mounting said second support arm to said support bar such that said second support arm extends substantially perpendicularly from said support bar and is moveable along said second support arm, said second support arm being disposed between said first support arm and said pivot member;
a plurality of support members disposed on respective ends of said first and second support arms, each said support member having means for mounting said support member to its respective said end such that said support member is adjustable along its respective said support arm.

14. The mounting apparatus of claim 13, wherein said means for mounting said second support arm comprises a bracket slidably mounted on said support bar and a set screw on said bracket for fixing said second support arm in position.

15. The mounting apparatus of claim 13, wherein each said means for mounting a said support member comprises an elongated slot in said support arm and a screw riding in said elongated slot.

16. The mounting apparatus of claim 13, wherein each said support member has a recess therein for receiving a supporting boss of a video display.

* * * * *